US009878577B2

(12) United States Patent
Hester et al.

(10) Patent No.: US 9,878,577 B2
(45) Date of Patent: Jan. 30, 2018

(54) HUB-ROTOR ADAPTER

(71) Applicants: Larry Bennett Hester, Dayton, OH (US); Russell Edward Rike, Spring Valley, OH (US)

(72) Inventors: Larry Bennett Hester, Dayton, OH (US); Russell Edward Rike, Spring Valley, OH (US)

(73) Assignee: WALTHER ENGINEERING AND MANUFACTURING COMPANY, INC., Franklin, OH (US)

( * ) Notice: Subject to any disclaimer, the term of this patent is extended or adjusted under 35 U.S.C. 154(b) by 352 days.

(21) Appl. No.: 14/484,629

(22) Filed: Sep. 12, 2014

(65) Prior Publication Data

US 2015/0069818 A1   Mar. 12, 2015

Related U.S. Application Data

(60) Provisional application No. 61/877,010, filed on Sep. 12, 2013.

(51) Int. Cl.
| | | |
|---|---|---|
| *B60B 27/00* | (2006.01) | |
| *F16D 65/12* | (2006.01) | |
| *F16D 65/02* | (2006.01) | |

(52) U.S. Cl.
CPC ........ *B60B 27/0052* (2013.01); *F16D 65/123* (2013.01); *B60B 2900/321* (2013.01); *F16D 2065/1384* (2013.01); *F16D 2065/1392* (2013.01)

(58) Field of Classification Search
CPC ........... B60B 27/0052; B60B 2900/321; F16D 65/123; F16D 2065/1392; F16D 2065/1384

USPC .............. 301/6.1, 6.7, 6.8, 6.9, 105.1
See application file for complete search history.

(56) References Cited

U.S. PATENT DOCUMENTS

| | | | | | |
|---|---|---|---|---|---|
| 2,787,430 | A * | 4/1957 | D Aurica | ................ | F03B 3/128 285/148.23 |
| 4,043,433 | A * | 8/1977 | Rainbolt | ............. | F16D 55/2262 188/206 R |
| 6,564,913 | B2 * | 5/2003 | Baumgartner | ........ | F16D 65/123 188/18 A |
| 6,877,207 | B1 * | 4/2005 | Barnhardt | ............... | F16D 65/12 29/557 |
| 6,880,682 | B2 * | 4/2005 | Gotti | ..................... | B60B 27/001 188/218 R |
| 6,880,877 | B2 * | 4/2005 | Sawayanagi | ............ | B60R 11/00 248/222.12 |
| 6,988,961 | B2 * | 1/2006 | Nesbitt | .............. | A63B 37/0003 473/373 |
| 7,665,584 | B2 * | 2/2010 | Hirotomi | ............ | B60B 27/0052 188/18 A |

(Continued)

FOREIGN PATENT DOCUMENTS

WO   WO 9513488 A1 *   5/1995   ............. F16D 65/12

*Primary Examiner* — S. Joseph Morano
*Assistant Examiner* — Jean Charleston
(74) *Attorney, Agent, or Firm* — Thompson Hine LLP

(57) ABSTRACT

A hub-rotor adapter for use with a disc brake assembly having an axle hub and rotor. The hub-rotor adapter may include an adapter body having a wall forming an annular opening at an inboard end thereof; the adapter body having an inboard flange shaped to be attached to the rotor, and an outboard flange shaped to be attached to the axle hub.

16 Claims, 9 Drawing Sheets

(56) References Cited

U.S. PATENT DOCUMENTS

| | | | | |
|---|---|---|---|---|
| 7,871,134 B2* | 1/2011 | Hofmann | ................ | B60B 27/00 |
| | | | | 301/105.1 |
| 2005/0139431 A1* | 6/2005 | Takizawa | ................ | F16D 65/12 |
| | | | | 188/26 |
| 2005/0230199 A1* | 10/2005 | Takizawa | ................ | B62L 1/005 |
| | | | | 188/218 XL |
| 2012/0073917 A1* | 3/2012 | Lee | ..................... | F16D 65/12 |
| | | | | 188/218 XL |
| 2012/0247883 A1* | 10/2012 | Root | ................ | B60B 27/0052 |
| | | | | 188/18 A |
| 2012/0280560 A1* | 11/2012 | Tasich | .................. | B60B 11/02 |
| | | | | 301/36.1 |

* cited by examiner

HUB-ROTOR ADAPTER

FIELD

This disclosure relates to vehicle braking systems, and more particularly, to mounting systems for the rotor of a disc brake.

BACKGROUND

A disc brake system may include a brake disc or rotor fixedly mounted on an axle hub of a vehicle, and a brake caliper having brake pads that are selectively urged against the opposing sides of the rotor to stop or slow rotation of the rotor and wheel on which it is mounted. Typically, the rotor is attached directly to, or directly interfaces with, the axle hub with no intermediate structure. This may limit the material properties of the interface between the rotor and axle hub to those properties of the axle hub itself A disadvantage of such designs is that the rotor and axle hub may be made of materials having different coefficients of thermal expansion, and/or may be heated to different temperatures during braking, so that the connecting portions of the axle hub and rotor will expand and contract at different rates or by different amounts. This differential in amount expansion and contraction places stresses on the portions of the axle hub and rotor forming the connection between the two. Another disadvantage of a direct interface between the rotor and axle hub is that heat from the rotor can be conducted directly into the bearing/grease or adjacent oil seal area. This prolonged heat can have a detrimental effect on both bearing and seal life.

Yet another disadvantage of such designs is that should a splined axle hub become worn or damaged, it is necessary to replace the axle hub at great time, expense, and downtime of the associated vehicle. Splined or other connections between the axle hub and rotor that accommodate relative expansion and contraction require costly machining of such features as splines and grooves, which greatly adds to the cost of the disc brake assembly. This is especially true if a hardened material is selected for the axle hub.

Accordingly, there is a need for a system that accommodates relative expansion and contraction of the axle hub and rotor, and yet is relatively simple and inexpensive to fabricate. There is also a need to have the flexibility of use of various materials as an interface between the rotor and the axle hub for both weight considerations as well as strength. Isolation of the interface of the rotor to hub joint away from the bearing/seal area will significantly improve system longevity and performance.

SUMMARY

In one embodiment, a hub-rotor adapter is disclosed for use with a disc brake assembly having an axle hub and rotor. The hub-rotor adapter may include an adapter body having a wall forming an annular opening at an inboard end thereof; the adapter body having an inboard flange shaped to be attached to the rotor, and an outboard flange shaped to be attached to the axle hub.

In another embodiment, a hub-rotor adapter is disclosed for use with a disc brake assembly having an axle hub with a tapered wall and a cylindrical extension, and a rotor having central opening. The hub-rotor adapter may include an adapter body having a wall forming an annular opening at an inboard end thereof, the adapter body having an inboard flange shaped to be attached to the rotor, and an outboard flange shaped to be attached to the axle hub, and wherein the wall of the adapter body includes an outboard frustoconical bell segment and an inboard substantially cylindrical segment immediately adjacent the frustoconical bell segment, the frustoconical bell segment tapers toward the cylindrical portion, the frustoconical segment of the tapered wall conforms in shape, length, and diameter to the tapered wall of the axle hub, and the generally cylindrical portion conforms in shape and diameter to the generally cylindrical extension of the axle hub, such that the adapter body is nested over the tapered wall and cylindrical extension of the inboard end of the axle hub.

In yet another embodiment, a disc brake assembly may include an axle hub having a tapered wall and a cylindrical extension; a rotor having central opening; a hub-rotor adapter having an adapter body including a wall forming an annular opening at an inboard end thereof, the adapter body having an inboard flange shaped to be attached to the rotor, and an outboard flange shaped to be attached to the axle hub, and wherein the wall of the adapter body includes an outboard frustoconical bell segment and an outboard substantially cylindrical segment immediately adjacent the frustoconical bell segment, the frustoconical bell segment tapers toward the cylindrical portion, the frustoconical segment of the tapered wall conforms in shape, length, and diameter to the tapered wall of the axle hub, and the generally cylindrical portion conforms in shape and diameter to the generally cylindrical extension of the axle hub, such that the adapter body is nested over the tapered wall and cylindrical extension of the inboard end of the axle hub.

Other objects and advantages of the disclosed hub-rotor adapter will be apparent from the following description, the accompanying drawings and the appended claims.

DETAILED DESCRIPTION

The disclosure is directed to a hub-rotor adapter that may act as an interface between the axle hub and the rotor of a disc brake. The hub-rotor adapter may be used in an air disc brake application for both Class 8 trailers and for tractors having a rotor, an axle hub, adapter and an air brake-actuated caliper assembly. In other embodiments, the hub-rotor adapter may be used in disc brake systems for any type of vehicle, including automobiles, trucks, sport utility vehicles (SUVs), and heavy equipment.

Figure 1:
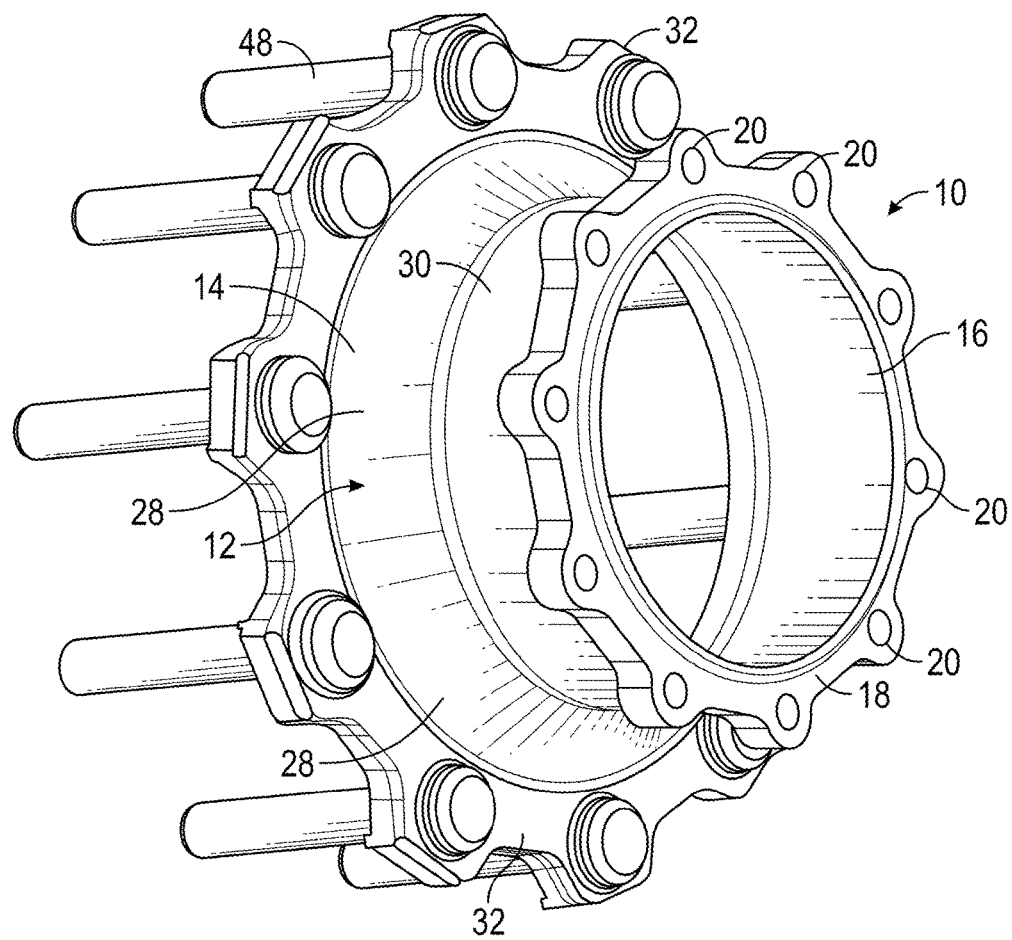
FIG. 1 is a perspective view of an embodiment of the disclosed hub-rotor adapter.

As shown in FIG. 1, in one embodiment of the disclosed hub-rotor adapter, generally designated 10, an adapter body 12 may include a wall, which in the embodiment shown may be an annular wall 14. The wall 14 may form an annular opening 16 at an inboard end (that is, toward the center of the associated axle, to the right in FIG. 1) that may be surrounded by an inboard flange 18. The annular opening 16 may extend through the hub-rotor adapter 10. Inboard flange 18 may be shaped to be attached to a rotor of an associated disc brake system (see FIGS. 2A and 2B, and associated discussion infra) In an embodiment, the inboard flange 18 may include a plurality of bolt holes 20 forming a ring about the opening 16. Bolt holes 20 may be spaced evenly about the periphery of the inboard flange 18 and positioned to receive threaded fasteners to attach a rotor.

Figure 2A:
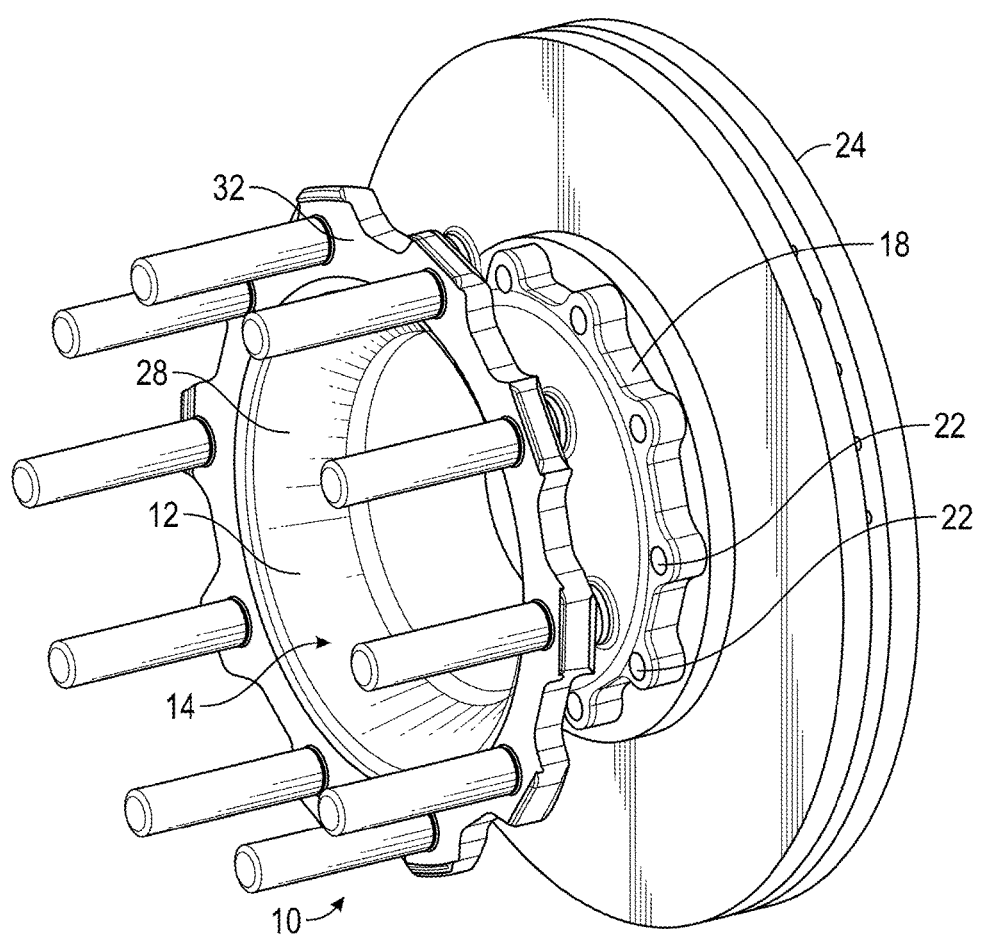
FIGS. 2A and 2B are perspective views of the hub-rotor adapter of FIG. 1, shown attached to a disc brake rotor.
Figure 2B:
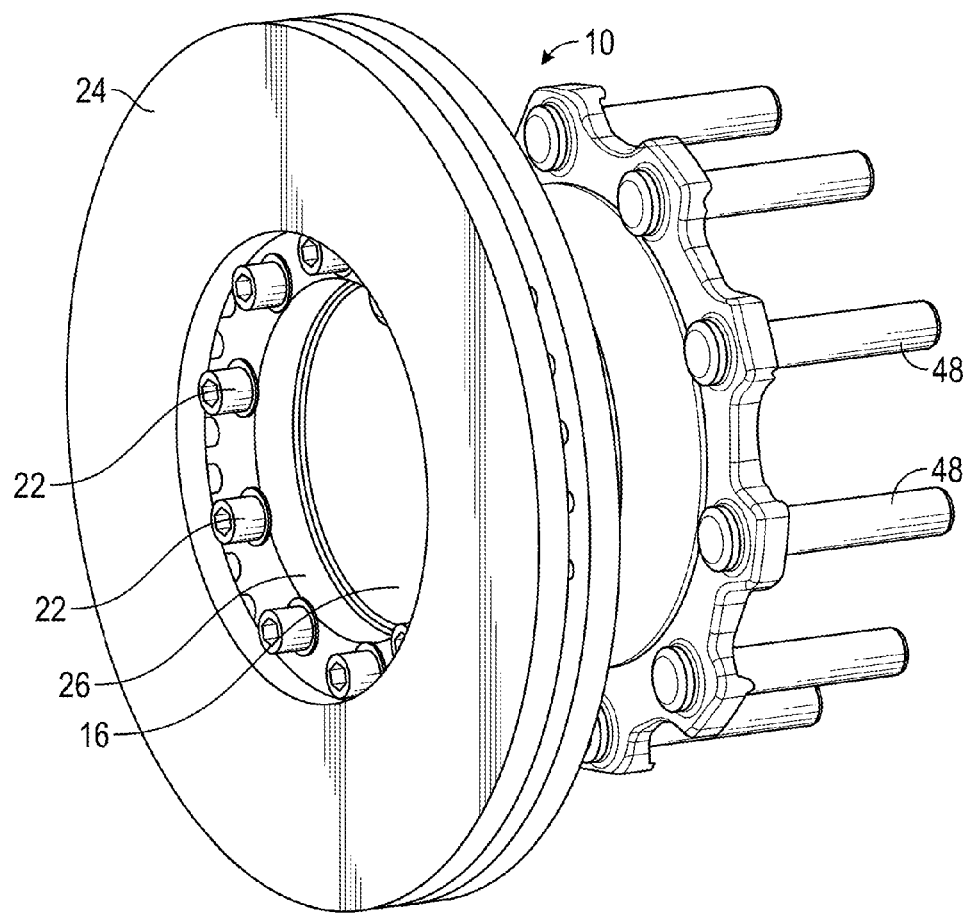
Figure 3:
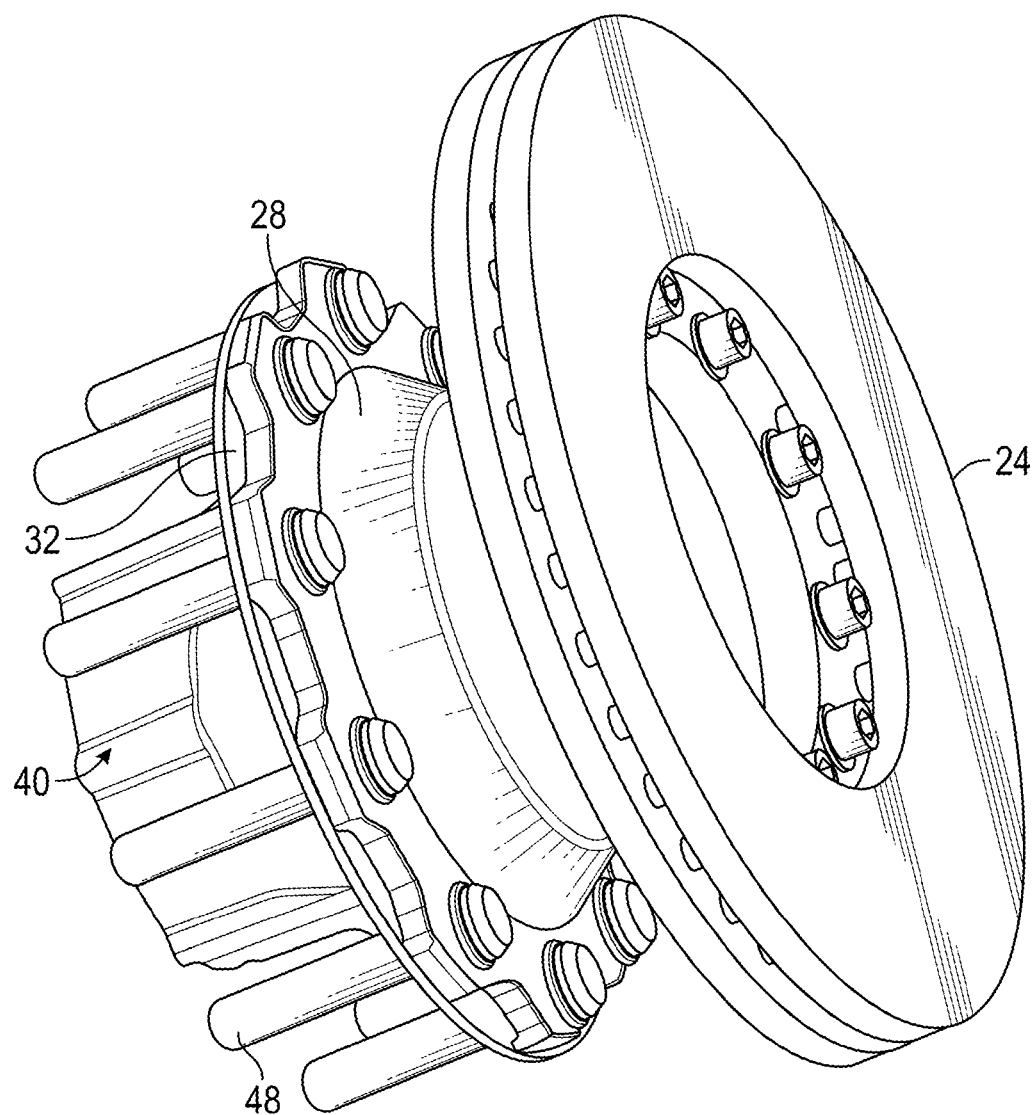
FIG. 3 is a perspective view of the hub-rotor adapter of FIG. 1, shown mounted on an axle hub and attached to a disc brake rotor.
Figure 4:
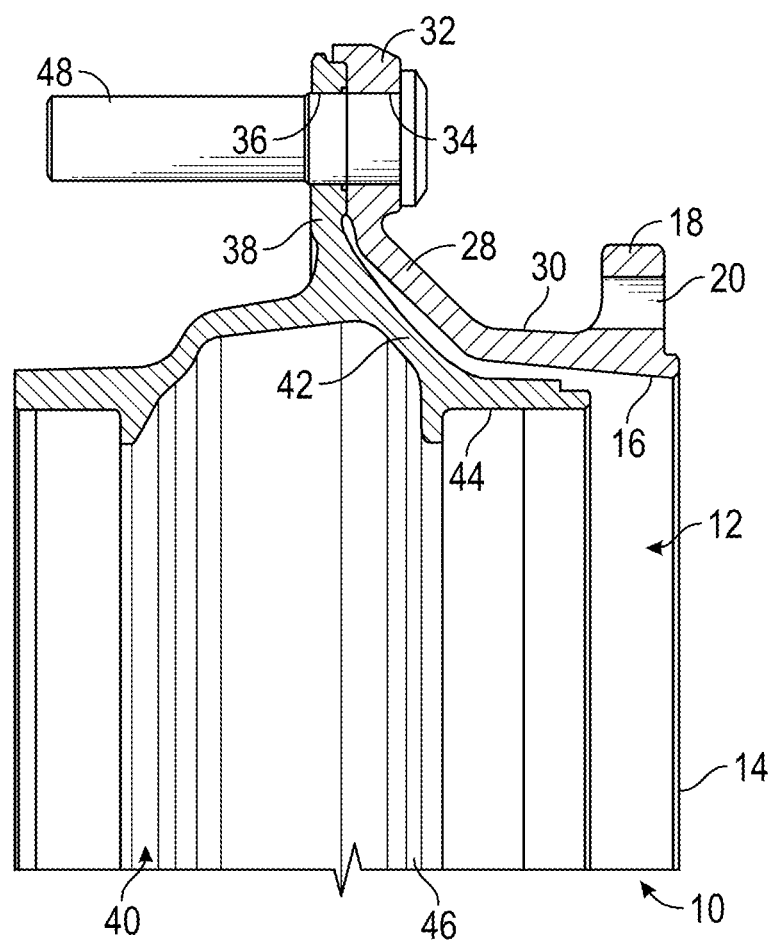
FIG. 4 is a detail in section of the attachment between the hub-rotor adapter and axle hub of FIG. 3.

As shown in FIGS. 2A and 2B, the bolt holes 20 (FIG. 1) of the inboard flange 18 may be sized and spaced to receive threaded fasteners, which may take the form of bolts 22, to secure the inboard flange 18 to a rotor 24 of a disc brake system (not shown). In other embodiments, the rotor 24 may be attached to the adapter body 12 of the adapter 10 by other means, such as radial splines or teeth (see FIGS. 6A and 6B, and associated discussion infra). The opening 16 of the adapter body 12 may be shaped to correspond in diameter to the central opening 26 in the rotor 24.

As shown in FIGS. 1, 2A, 3, and 4, the wall 14 of the adapter body 12 of the hub-adapter 10 may include an outboard frustoconical bell segment 28 and an inboard cylindrical, or substantially cylindrical, segment 30 that may be immediately adjacent the outboard frustoconical bell segment. In embodiments, the outboard frustoconical bell segment 28 may taper toward and transition to the inboard cylindrical segment 30 and opening 16. The substantially cylindrical segment 30 may be cylindrical (as in a right cylinder), or taper in diameter slightly toward the inboard end of opening 16, which may include the inboard flange 18. The frustoconical segment 28 of the adapter body 12 may terminate in an annular outboard flange 32 shaped to be attached to an axle hub of an associated disc brake assembly. In an embodiment, the outboard flange 32 may include a plurality of bolt holes 34. Bolt holes 34 may be spaced evenly about the periphery of the outboard flange 32 and align with mounting holes 36 formed in the mounting flange 38 of the axle hub, generally designated 40, on which the hub adapter 10 is to be mounted.

The frustoconical segment 28 of the tapered wall 14 may conform in shape (including angle of taper), length, and diameter to the tapered wall 42 of the axle hub 40. The substantially cylindrical segment 30 may conform in shape and diameter to the generally cylindrical extension 44 of the axle hub 40. Thus, the adapter body 12 may be nested over the tapered wall 42 and cylindrical extension 44 of the inboard end 46 of the axle hub 40, and be secured thereto by a plurality of threaded fasteners 48 inserted through bolt holes 34 and either threaded into mounting holes 36, or secured the in mounting holes by nuts (not shown) or other fastening devices. This assembly may be fitted to an axle with bearings as a complete unit. The hub-rotor adapter 10 may be shaped to transmit braking force from the rotor 24 (FIGS. 2A and 2B), through the body 12, to the axle hub 40.

Figure 5A:
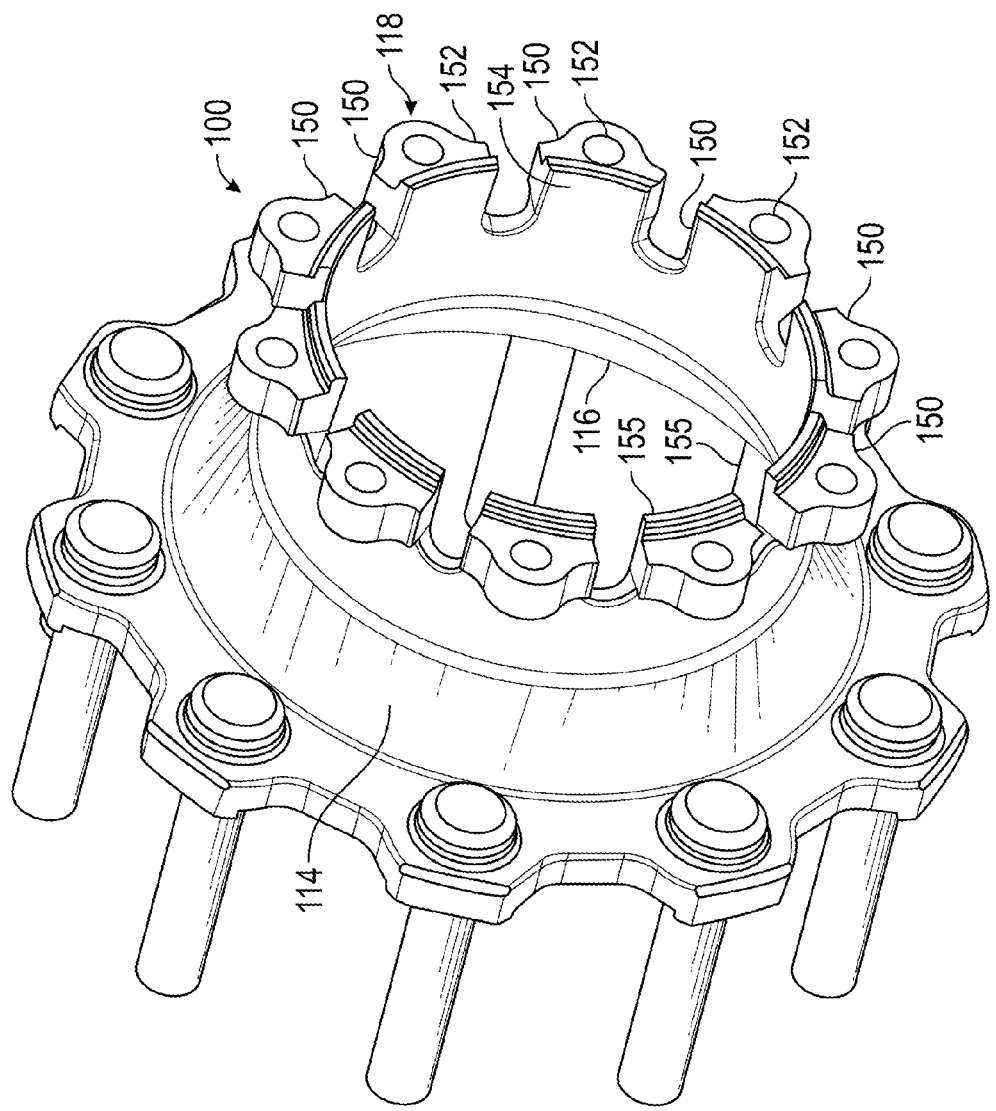
FIGS. 5A and 5B are perspective views of another embodiment of the disclosed hub-rotor adapter, shown in FIG. 5B attached to a disc brake rotor.
Figure 5B:
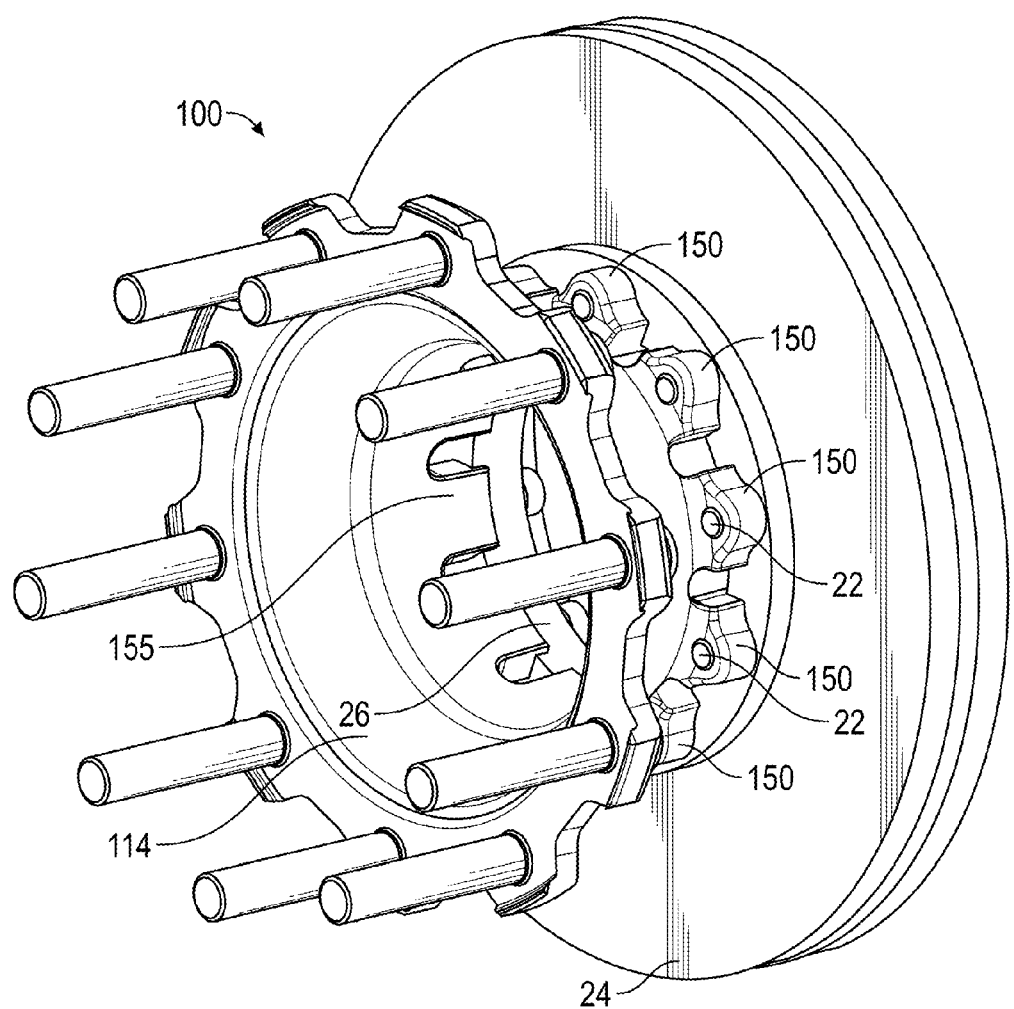

As shown in FIGS. 5A and 5B, in another embodiment of the disclosed hub-rotor adapter, generally designated 100, the adapter wall 114 may include an inboard flange 118 that is segmented to form a plurality of axially extending fingers 150. Each finger 150 may include a mounting hole 152 shaped and threaded to receive a threaded fastener 22 to attach a rotor 24 to the inboard flange 118. Each finger 150 may have an inner wall 154 that may be arcuately shaped to form a segment of the circular opening 116 in the adapter wall 114. In an embodiment, the fingers 150 may be spaced evenly about the periphery of the opening 116. The mounting holes 152 may be positioned to correspond to and align with mounting holes (not shown) in the rotor 24. In an embodiment, each finger 150 may include a step 155 shaped to engage a segment of the opening 26 of the rotor 24 to center and secure the rotor relative to the adapter 100.

The fingers 150 may be shaped and/or made of material sufficiently flexible to allow the fingers to deflect radially outwardly in response to radial expansion of the rotor 24 as the rotor is heated as a result of friction from engagement with brake pads (not shown) during a braking function. Conversely, the fingers 150 may deflect radially inwardly in response to contraction of the rotor 24 as it cools. This flexibility may reduce stresses that otherwise may be imposed on the rotor 24 by the connection with the adapter 100 resulting from radial expansion and contraction of the rotor during cycles of heating and cooling during use.

Figure 6A:
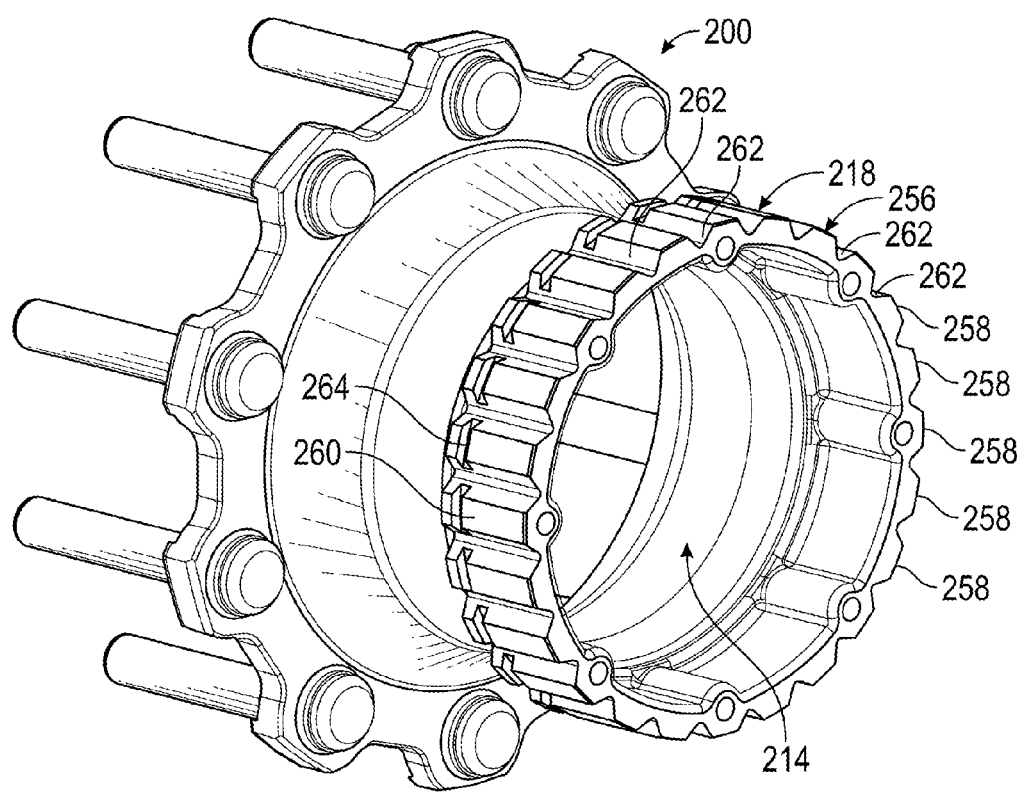
FIGS. 6A and 6B are perspective views of yet another embodiment of the disclosed hub-rotor adapter.
Figure 6B:
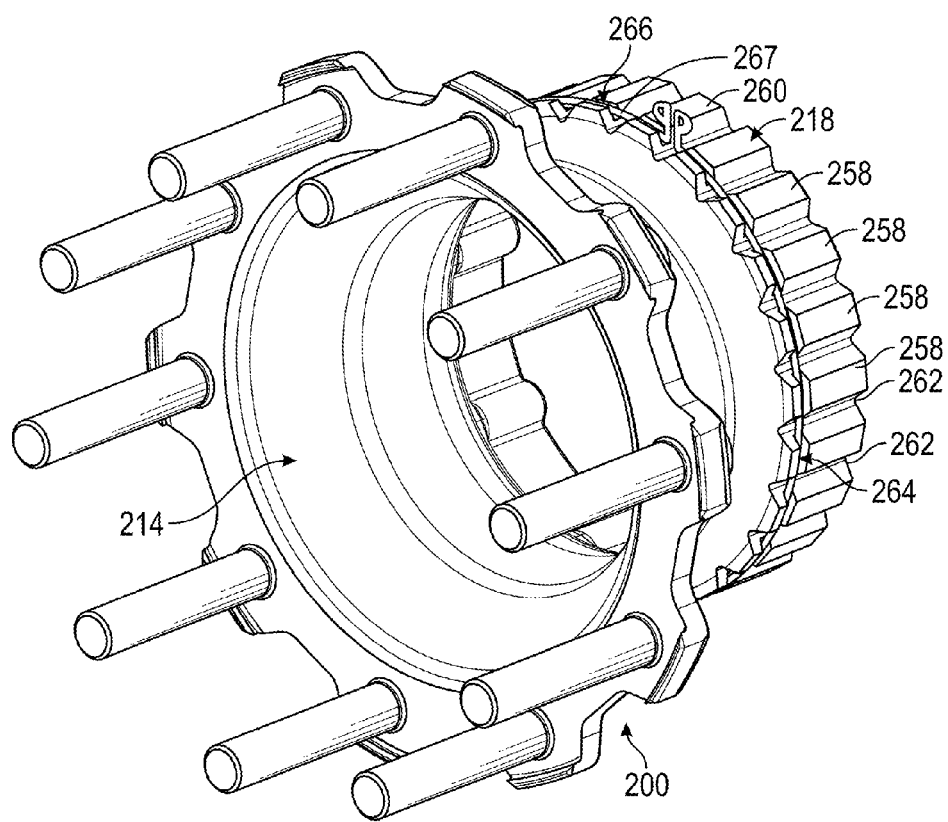

As shown in FIGS. 6A and 6B, in yet another embodiment of the disclosed hub-rotor adapter, generally designated 200, the adapter wall 214 may include an inboard flange 218 having an annular wall 256 with a plurality of axially extending splines 258 formed thereon. The splines 258 may include radially outboard, arcuate flats 260 and may be separated by V-shaped longitudinal grooves 262. In an embodiment, the splines 256 may be spaced evenly about the outer periphery of the annular wall 256. The annular wall 256 may include groove segments 264 extending through the splines 258 that collectively form an annular groove 266. The annular groove 266 may be shaped to partially receive a snap ring 267 that may expand partially against a corresponding groove in a rotor (not shown) to secure the rotor to the adapter 200 and prevent relative axial movement of the rotor and adapter in a direction away from the adapter. A retaining plate mounted to the wall 256 and biased against the rotor may prevent axial movement of the rotor toward the adapter 200. The rotor used with the adapter 200 of this embodiment may include a central, complementarily shaped opening that engages the splines 258 and grooves 262 so that a resistance to rotation of the adapter 200 and hub 40 (FIG. 3) may be transmitted from the rotor 24 during braking The engagement of such a rotor with the splines 258 and grooves 262 may allow the rotor to expand when heated during a braking operation relative to the adapter 200 without the adapter transmitting stresses between the rotor and the axle hub 40 (FIG. 4), and yet remain sufficiently engaged with the adapter to transmit braking forces to the hub 40 (see FIG. 2A).

With previous designs, the rotor 24 may be attached directly to the axle hub 40 itself. Utilizing the disclosed hub-rotor adapter embodiments 10, 100, 200, in which the rotor 24 may be attached to the hub-rotor adapter that in turn may be attached to the axle hub 40, provides considerably more design freedom in an assembly. The hub-rotor adapter embodiments 10, 100, 200 may be made from various materials such as aluminum, ductile iron, austempered ductile iron, and grey iron.

The hub-rotor adapter embodiments 10, 100, 200 may be made of a material different than that of the axle hub 40. Axle hubs 40 typically may be made from either aluminum, ductile iron or austempered ductile iron. The rotor 24 may be attached to the hub-rotor adapter embodiments 10, 100, 200 at the outboard flange 18, and pilot onto the axle hub 40 at the body 14 and inner flange 32.

Some current air disc brake assemblies have radial splines and teeth that interface with clearance fits between the rotor and the axle hub. As a result, they are subject to wear over the life of the product. These splines or teeth allow for radial expansion of the rotor when subjected to high heat loads. Numerous designs have been developed in an attempt to limit the wear between this interface, such as shims or spacers. However, such additional components add cost and complexity to the product.

Use of embodiments of the disclosed hub-rotor adapter 10, 100, 200, which in embodiments may be made of harder material, such as austempered ductile iron, may provide an advantage over current technology. Manufacture of an austempered ductile iron hub with splines or teeth would be extremely difficult in comparison to the disclosed hub-rotor adapter of embodiments 10, 100, 200, the latter of which may provide more design flexibility. Further, if wear were to occur on the contact surface between the disclosed hub-rotor embodiments 10, 100, 200, only the hub-rotor adapter may have to be replaced. It would not be necessary to replace the entire axle hub assembly itself, which may provide an economic advantage. By selectively choosing lightweight materials for the hub-rotor adapter 10 (as well as hub-rotor adapters 100, 200), the overall weight of this assembly may be greatly reduced over current designs.

While the forms of apparatus described herein constitute preferred embodiments of the disclosed hub-rotor adapter, it is to be understood that the invention is not limited to these precise forms of apparatus, and that changes may be made therein without departing from the scope of the invention.

What is claimed is:

1. For use with a disc brake assembly having an axle hub and rotor, a hub-rotor adapter comprising:
   an adapter body including a wall forming an annular opening at an inboard end thereof;
   the adapter body having an inboard flange shaped to be attached to the rotor, and an outboard flange shaped to be attached to the axle hub;
   the wall of the adapter body including an outboard frustoconical bell segment that conforms in shape, length, and diameter to a tapered wall of the axle hub, and an inboard substantially cylindrical segment, immediately adjacent the bell segment, wherein the outboard frustoconical bell segment tapers toward the cylindrical portion, the inboard substantially cylindrical segment conforming in shape and diameter to a generally cylindrical extension of the axle hub, such that the adapter body is shaped to be nested over the tapered wall of the axle hub and the generally cylindrical extension of the axle hub; and
   a plurality of threaded fasteners, wherein the outboard flange of the adapter body includes bolt holes, whereby the adapter body is secured to the axle hub by the plurality of threaded fasteners inserted through the bolt holes and through mounting holes of the axle hub.

2. The hub-rotor adapter of claim 1, wherein the inboard flange includes a plurality of bolt holes spaced about the periphery thereof and positioned to receive fasteners to attach the rotor.

3. The hub-rotor adapter of claim 1, wherein the inboard flange includes radial splines shaped to engage corresponding grooves on a central opening of the rotor.

4. The hub-rotor of claim 1, wherein the plurality of bolt holes are spaced about a periphery of the outboard flange thereof and aligned with the mounting holes in the mounting flange of the axle hub on which the hub-rotor adapter is to be mounted, such that the hub-rotor adapter is attachable to the axle hub by passing threaded fasteners through the bolt holes and mounting holes.

5. The hub-rotor adapter of claim 1, wherein the annular opening is shaped to correspond in diameter to a central opening in the rotor.

6. The hub-rotor adapter of claim 1, wherein the substantially cylindrical portion is selected from a right cylinder shape and a shape that tapers in diameter slightly toward the inboard end of the opening.

7. The hub-rotor adapter of claim 1, wherein the inboard flange is segmented to form a plurality of axially extending fingers.

8. The hub-rotor adapter of claim 7, wherein each finger of the plurality of fingers includes a mounting hole shaped and threaded to receive a threaded fastener to attach the rotor to the inboard flange.

9. The hub-rotor adapter of claim 8, wherein each of the fingers includes a step shaped to engage a segment of the opening of the rotor to center and secure the rotor relative to the adapter.

10. The hub-rotor adapter of claim 7, wherein the fingers are shaped and/or made of material sufficiently flexible to allow the fingers to deflect radially outwardly in response to radial expansion of the rotor as the rotor is heated as a result of a braking function, and the fingers deflect radially inward in response to contraction of the rotor as it cools.

11. The hub-rotor adapter of claim 7, wherein the inboard flange has an annular wall with a plurality of axially extending splines formed thereon shaped to engage a rotor having a central, complementarily shaped opening that engages the splines so that a resistance to rotation of the adapter and hub may be transmitted from the rotor during braking to allow the rotor to expand when heated during a braking operation relative to the adapter without the adapter transmitting stresses between the rotor and the axle hub, and yet remain sufficiently engaged with the adapter to transmit braking forces to the hub.

12. The hub-rotor adapter of claim 11, wherein the splines include radially inboard, arcuate flats separated by V-shaped longitudinal grooves; and wherein the splines are spaced evenly about the outer periphery of the annular wall.

13. The hub-rotor adapter of claim 12, wherein the annular wall includes annular groove segments extending through the splines that collectively form an annular groove shaped to partially receive a snap ring that may expand partially against a corresponding groove in the rotor to secure the rotor to the adapter and prevent relative axial movement of the rotor and adapter in a direction away from the adapter.

14. The hub rotor adapter of claim 1, wherein the hub rotor adapter is made of a material selected from aluminum, ductile iron, austempered ductile iron, grey iron, and a material different than that of the axle hub.

15. A disc brake assembly comprising:
   an axle hub having a tapered wall, a cylindrical extension, and an annular mounting flange adjacent the tapered wall;
   a rotor having a central opening; and
   a hub-rotor adapter having an adapter body including a wall forming an annular opening at an inboard end thereof, the adapter body having an inboard flange attached to the rotor, and an outboard flange attached to the annular mounting flange of the axle hub, and wherein the wall of the adapter body includes an outboard frustoconical bell segment and an inboard substantially cylindrical segment immediately adjacent the frustoconical bell segment, the frustoconical bell segment tapers toward the cylindrical portion, the frustoconical segment of the tapered wall conforms in shape, length, and diameter to the tapered wall of the axle hub, and the generally cylindrical portion conforms in shape and diameter to the generally cylindrical extension of the axle hub, such that the adapter body is nested over the tapered wall and cylindrical extension of the inboard end of the axle hub and both such that the tapered wall and the cylindrical extension of the axle hub are within the outboard frustoconical bell segment and the inboard substantially cylindrical segment of the adapter body.

16. For use with a disc brake assembly having an axle hub and rotor, the axle hub having a mounting flange, a hub-rotor adapter comprising:
an adapter body including a wall forming an annular opening at an inboard end thereof;
the adapter body having an inboard flange shaped to be attached to the rotor, and an outboard flange shaped to be attached to the mounting flange of the axle hub; the wall of the adapter body including an outboard frustoconical bell segment and an inboard substantially cylindrical segment immediately adjacent the bell segment, the frustoconical bell segment tapering toward the cylindrical segment and conforming in shape, length, and diameter to a tapered wall of the axle hub, such that the adapter body is shaped to be nested over the tapered wall of the axle hub so that the tapered wall of the axle hub is within the frustoconical bell segment of the tapered wall, and the substantially cylindrical segment conforming in shape and diameter to a generally cylindrical extension of the axle hub such that the adapter body is shaped to be nested over a cylindrical extension of the axle hub; and
a plurality of threaded fasteners; and wherein the outboard flange of the adapter body includes bolt holes, whereby the adapter body is secured to the axle hub by the plurality of threaded fasteners inserted through the bolt holes and through mounting holes of the axle hub.

* * * * *